April 9, 1935.  S. LAKE  1,997,149
SUBMARINE LOCATING, HARVESTING, AND RECOVERY APPARATUS
Filed Oct. 15, 1931  5 Sheets-Sheet 1
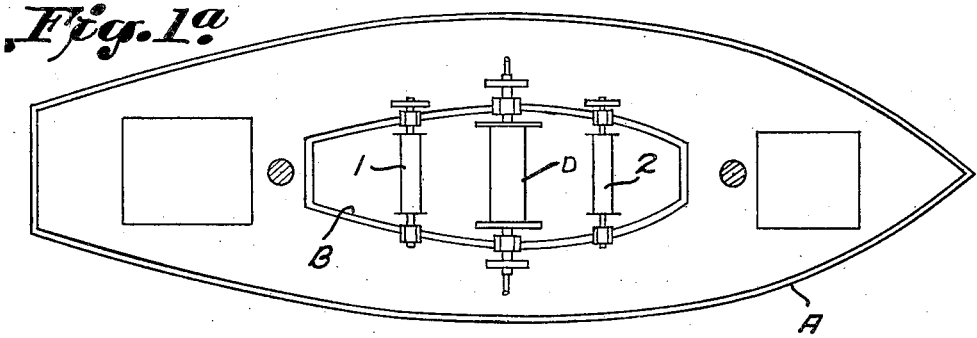
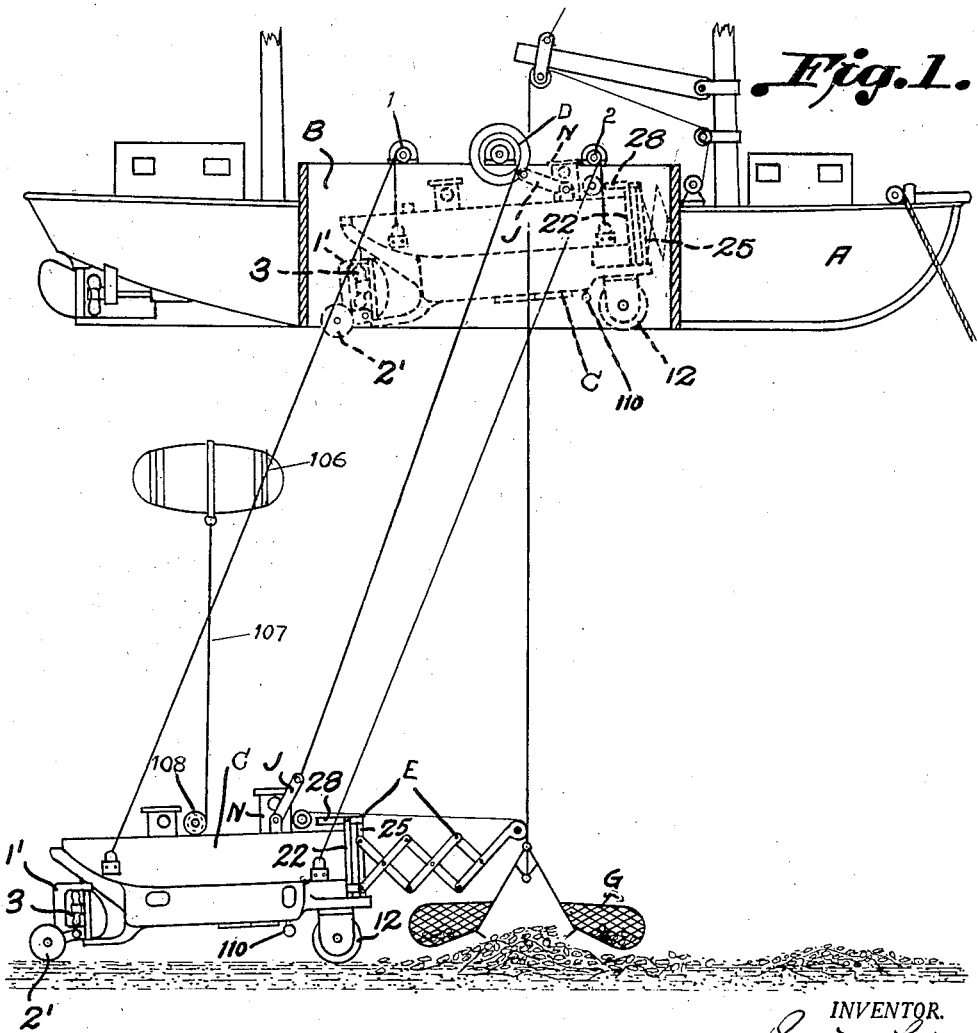
INVENTOR.
Simon Lake

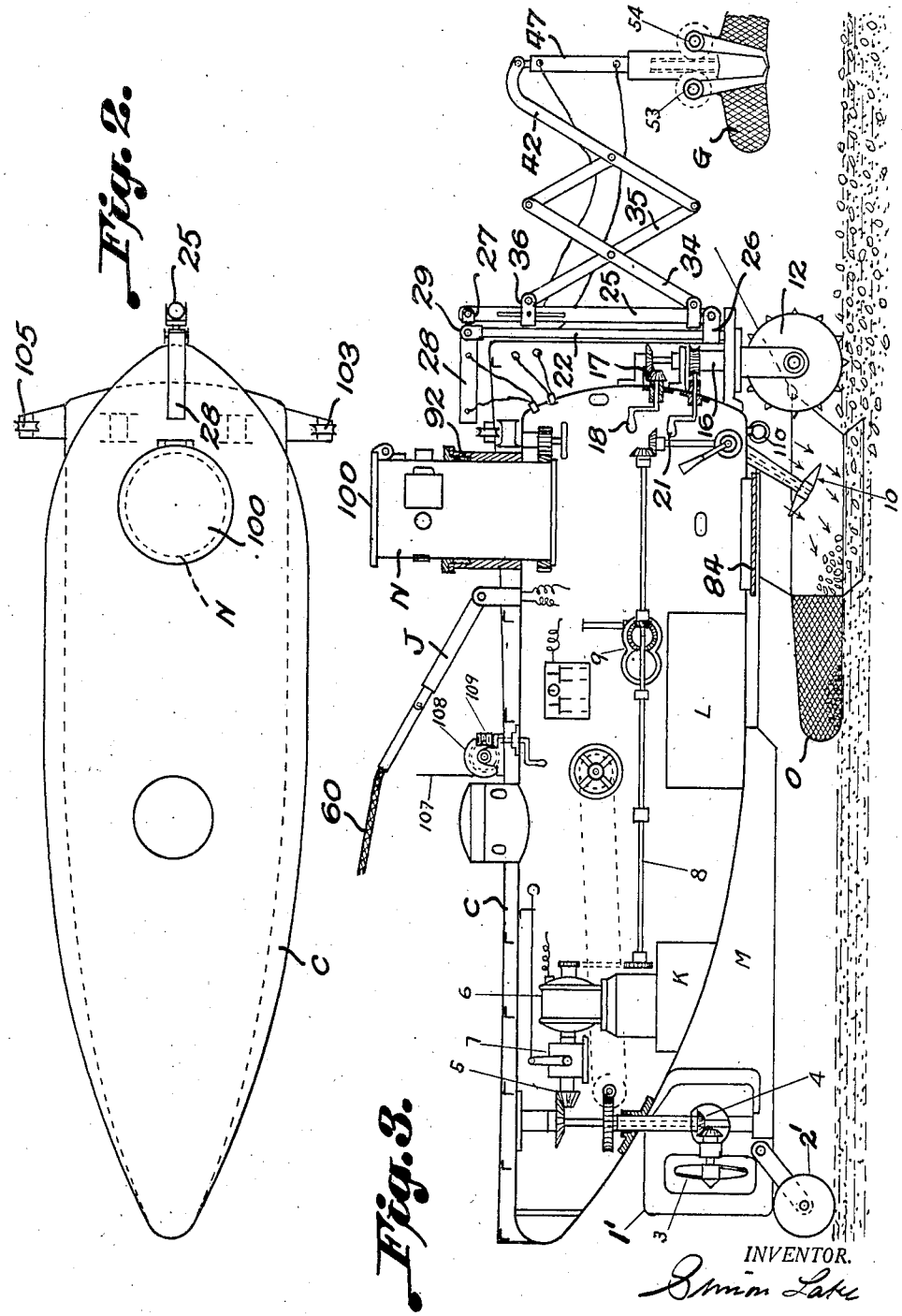

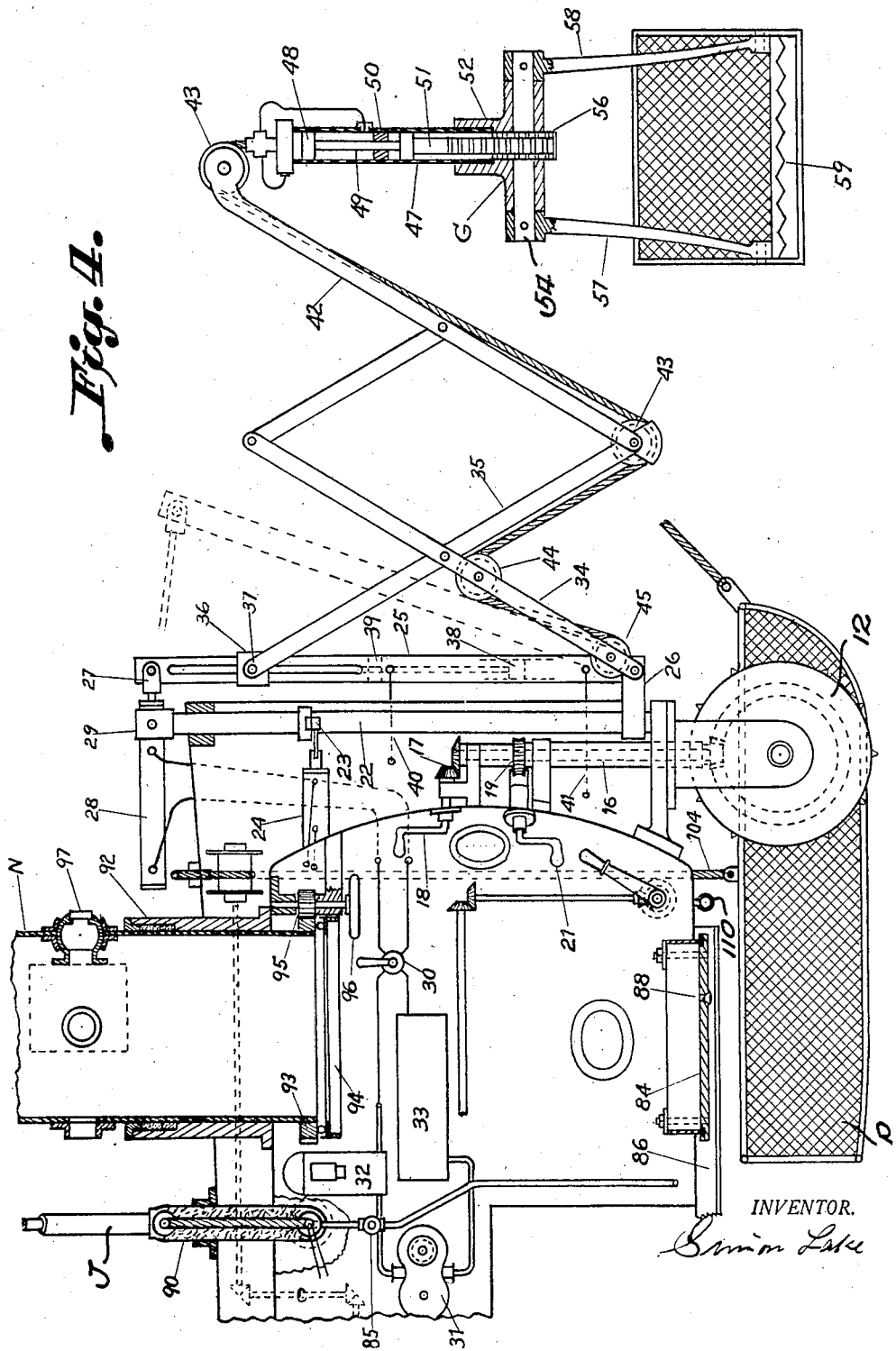

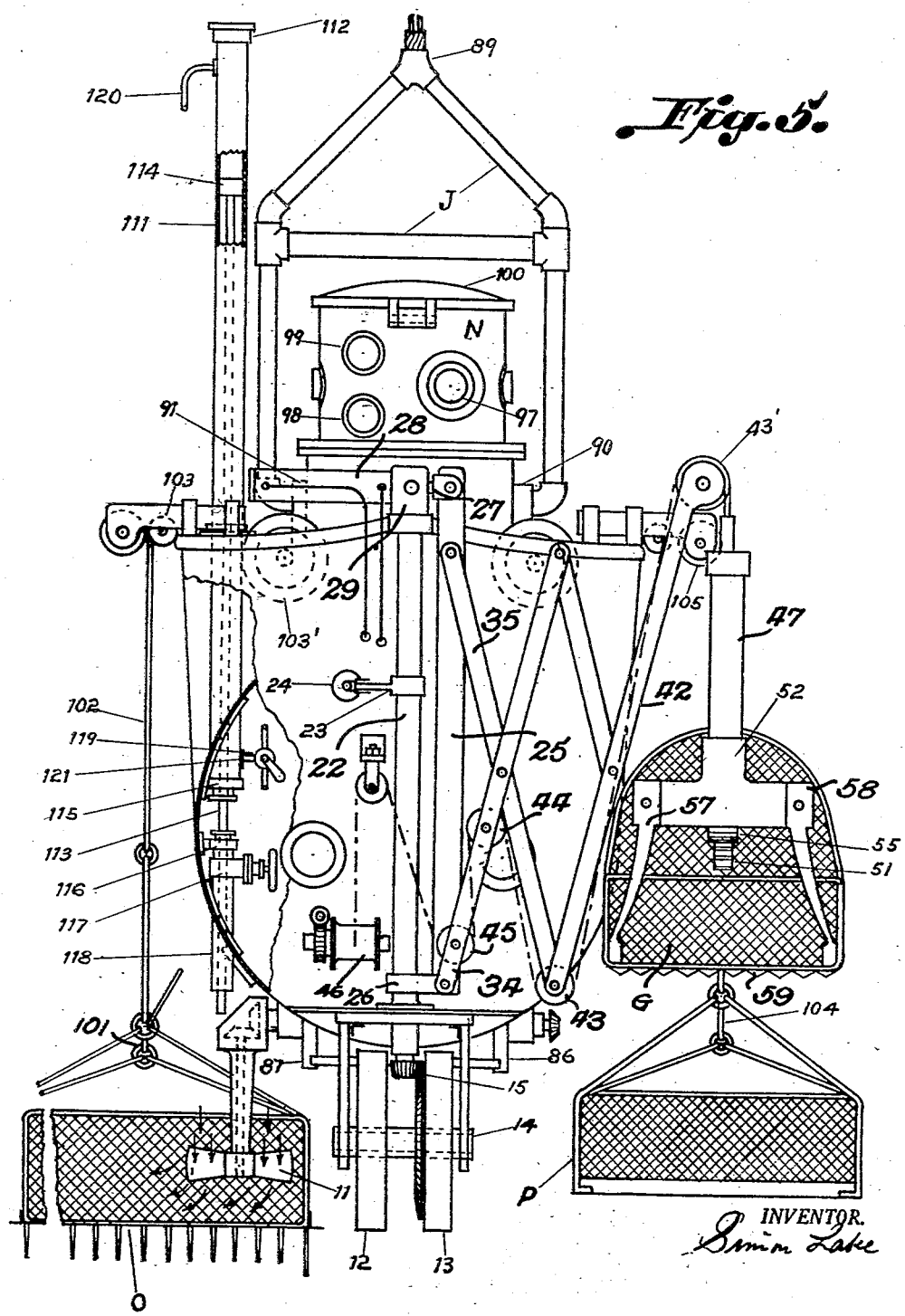

April 9, 1935. S. LAKE 1,997,149
SUBMARINE LOCATING, HARVESTING, AND RECOVERY APPARATUS
Filed Oct. 15, 1931 5 Sheets-Sheet 5
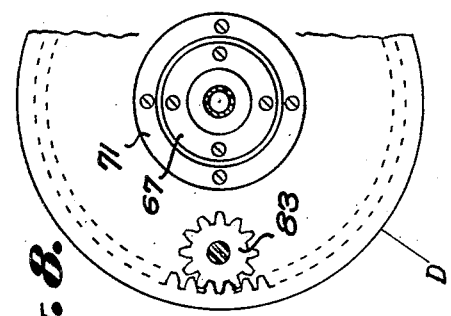
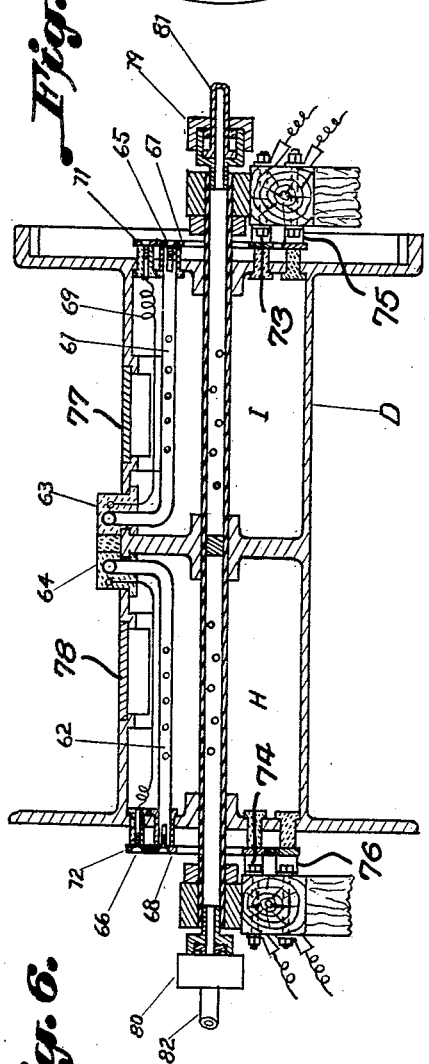
INVENTOR.
Simon Lake Patented Apr. 9, 1935

1,997,149

UNITED STATES PATENT OFFICE 1,997,149

SUBMARINE LOCATING, HARVESTING, AND RECOVERY APPARATUS

Simon Lake, Milford, Conn.

Application October 15, 1931, Serial No. 568,973

8 Claims. (Cl. 61—69)

This invention relates to submarine locating, harvesting and recovery apparatus, especially designed for recovering the natural products of the sea, but capable of co-operation with a surface vessel in locating and recovering sunken ships and cargoes and of removing or replacing rock in certain kinds of submarine engineering work. The invention embodies improvements on some of my previous devices on which Letters Patent of the United States of America have already been granted.

The object of the present invention is to provide a safe and more flexible submarine apparatus in which the operator is not subjected to hydrostatic pressure in deep water, as is a diver engaged in recovering sponges, pearl shells, edible shell fish and other natural products of the sea when using the usual type of diving dress. At the same time it makes possible the recovery of much larger quantities of such products per man per diem. It is also well adapted to the securing of photographs of both animate and inanimate objects under the sea.

As the recovery of different natural products requires different arrangements of harvesting attachments, I shall describe the operations of such arrangements separately in the description following.

In the accompanying drawings illustrating the invention, in the several figures of which like parts are similarly designated, Figure 1 shows in sectional elevation, a general arrangement of a specially constructed type of surface vessel well suited to convey the submarine recovery apparatus, while navigating on the surface in rough weather and in which the small submarine is housed in a well, as shown in broken lines, the submarine being shown also, in full lines, on the waterbed in the act of placing a grab over a growth of sponges. Fig. 1a is a plan view of the surface vessel. Fig. 2 is an enlarged plan view of the submarine apparatus. Fig. 3 is an enlarged inboard longitudinal section of the submarine recovery apparatus, with one type of recovery grab controlled from within the submarine and suitable for recovering objects lying on the waterbed; and showing also a dredge and apparatus for recovering deeply imbedded shell fish. Fig. 4 is a further enlarged fragmentary sectional view of the forward portion of the submarine recovery apparatus with the recovery grab and operating mechanisms shown in more detail. Fig. 5 is a bow view with parts in section, showing the recovery grab swung around in position to dump the recovered products into a receptacle for hoisting to the surface and showing also a propeller mechanism for scouring away the surface of the waterbed to uncover certain kinds of shell fish which burrow to a considerable depth under the surface of the sea bottom, such as the several varieties of soft shell or long neck and razor clams. Fig. 6 is an enlarged sectional view of the control drum carried by the surface vessel, and its connections. Fig. 7 is a plan view of the drum mounted. Fig. 8 is a fragmentary end view of the drum showing one of the rings for transmitting electric current to the motor in the submarine through one of the metallic air transmission tubes, and another ring for the transmission of telephone and signal calls, similar rings being provided at the opposite end of the drum.

A designates a surface vessel with a well B extending through the hull, this well being large enough to house the submarine C. The submarine C is fitted with water ballast tanks K, L, and M capable of being filled and emptied to regulate the buoyancy of the apparatus. Strong drum shafts 1 and 2 extend across the coaming around the well B, and on these shafts are wound wire ropes, on the outer ends of which are fitted hooks which may be hooked into pad eyes attached to the hull of the submarine and by means of which it may be drawn upward into the well where it may be properly secured to prevent its shifting in a seaway. It is obvious, however, that the submarine could also be towed, but this would necessitate a much slower speed of navigation than is possible when the submarine is housed in the well, due to the fact that stream lining of the submarine is not as good as that of the surface vessel.

D is a drum on which are carried the electric transmission cables, flexible compressed air piping, telephone and signal wires, etc. as shown somewhat in detail in Figs. 6, 7 and 8.

E indicates an extensible and retractable arm mechanism more fully described hereinafter, in connection with Figures 3, 4 and 5.

The surface vessel is equipped also with the usual propelling machinery, and with an electric generator, batteries and an air compression and vacuum pump (not shown) for certain essential purposes.

Steering of the submarine apparatus C while on the bottom is accomplished by means of the rudder 1' and wheel 2', and propulsion is by means of the propeller 3 which is driven through the medium of pairs of bevel gears 4 in the rudder post and another pair of bevel gears 5 within the body of the submarine, which are driven by a motor 6 through a reverse gear box 7. The motor 6 also drives the auxiliary shaft 8 which, through suitable gears and clutches, drives the hydraulic pressure pump 9 and scouring propellers 10 and 11 in the manner somewhat diagrammatically illustrated in Fig. 3. I have not considered it necessary to describe these various drives, etc., in more detail as it would confuse the drawings and follows well-known practice.

The forward wheels 12 and 13 of the submarine are both keyed to the hollow shaft 14 and are driven by a set of bevel gears 15, the pinion of which is mounted on a vertical shaft within the hollow steering shaft 16 and is in turn driven by a set of bevel gears at 17, the pinion of which is mounted on a shaft extending through a suitable stuffing box into the hull where it is operated by a crank 18. The steering shaft 16 which carries the wheels 12 and 13 as shown is rotated by a worm wheel driven by a shaft also extending into the hull through a stuffing box and operated by a crank 21.

As it is essential to have very accurate control of the apparatus to pick up scattered objects on the sea bottom, it is necessary that the operator in the bow of the submarine apparatus may be able to swing the same to either side and to move it backward or forward, which the above-described arrangement provides for, the objects lying on the sea bottom being visible from various look-out windows.

In picking up scattered objects lying on the sea bottom, such as sponges, it is also essential to have an additional independent mechanism that can be caused to function similarly to the human arm and hand and which can be swung to either side, raised and lowered and made to grab and release objects at the will of the operator in the submarine apparatus. These functions are accomplished by an extensible arm mechanism carried by a vertical shaft 22, mounted in suitable bearings at its top and bottom and preferably capable of being partially rotated by a bell crank 23, and hydraulic mechanism, the cylinder of which latter is shown at 24, suitable valves, not shown, being provided to cause the piston in cylinder 24 to move back and forth in the usual manner, thus rotating shaft 22.

25 is a tubular shaft pivotally carried in a footing 26 secured to vertical shaft 22 at its bottom, and secured at its upper end to the end of a piston rod at 27. This piston rod is secured to a piston in the hydraulic cylinder 28, which cylinder is pivotally mounted in a yoke 29 carried by the vertical shaft 22. Flexible piping diagrammatically indicated by a single line leads from each end of cylinder 28 down into the submarine apparatus to a four-way valve 30 forming part of a hydraulic system in which 31 is a hydraulic pressure pump, 32 an accumulator and 33 a reservoir for storage of the fluid used. The four-way valve functions as follows:—Pushing the handle forward admits the fluid to the after end of cylinder 28 pushing the piston and, through its connections, the tubular shaft 25 forward in position as shown by broken lines, Fig. 4, and pushing the handle of the valve backward admits the fluid to the forward end of the cylinder 28 and by pushing the piston backward, returns the tubular shaft 25 to its original position. Suitable ports in the four-way valve permit return to the reservoir 33 of the fluid from that end of the cylinder opposite the end to which the pressure fluid is being admitted. The fluid thus returned is automatically taken up by the electric-driven pump 31 and forced into the pressure accumulator 32, as is common practice in hydraulic systems of this character.

The extensible retractable arm mechanism hereinbefore referred to comprises a pair of lazy tongs sections 34 and 35 pivoted together. The end of section 34 straddles the footing 26 as shown, and is pivoted thereto, and the upper end of section 35 straddles and is pivoted at 37 to a sliding sleeve 36. The pivot 37 extends through the upper end of a piston rod connected to a piston 38, indicated by dotted lines, within the tube 25, which tube is blocked off at its lower end and is provided at 39 with a stuffing box through which the piston rod slides. Flexible pipes 40 and 41 lead to a four-way valve similar to valve 30, but not shown, through which fluid under pressure may be admitted and exhausted, alternately, to and from the cylinder above and below the piston, thus causing the piston to push the sleeve 36 up and down to thereby extend and retract the arm mechanism as desired. Between the outer section 42 of the lazy tongs I provide a sheave 43 and over this sheave passes a rope carrying a grab G. The rope also passes over sheaves 43′, 44 and 45, and thence to drum 46, shown only in Fig. 5, which is operated by a worm wheel and worm with a shaft extending through a stuffing box into the hull, similar to that described in relation to gearing 19, thus permitting the grab G to be raised and lowered by the operator from within the submarine apparatus. The rope I use is of special construction containing within it two small flexible tubes which act as ducts to supply the pressure fluid which opens and closes the grab. The inboard ends of these tubes enter separate pressure compartments in the drum 46 and from them the fluid is led through suitable pipes and stuffing boxes to another four-way valve similar to valve 30, but not shown. The outer ends of the flexible tubes admit the pressure fluid into the cylinder 47 forming part of the grab, one tube entering above the piston 48 and the other below the piston, as shown in Fig. 4, thus forcing the piston up or down. The piston rod 49 passes through a packing gland 50 and is secured to a double rack extension 51. A housing 52 carries two shafts 53 and 54, indicated in Fig. 3, on which shafts are secured toothed segments 55 and 56, Figs. 4 and 5. On the outer ends of the shafts there are secured arms 57 and 58 which may carry various types of buckets or toothed bars for dredging or grabbing up materials of different kinds. In Figs. 4 and 5 I have indicated a series of angular knife blades or a tooth bar 59 which would be of value in cutting sponges free from the substance to which they may be attached, thus leaving the roots intact for future growth.

In the operation of recovering sponges, the procedure would be for the surface vessel to sail along over the waterbed with the submarine apparatus suspended some distance below the keel of the surface vessel at a proper depth to permit of a good view of the sea bottom. Upon sponge beds being discovered the surface vessel would be brought to a stop and the submarine apparatus lowered to the bottom and thereafter several methods of operation could be pursued. The surface vessel may be anchored, as is illustrated in Fig. 1, and the submarine maneuvered over the bottom and the open grab placed over the sponges, as shown in Fig. 1, or sufficient water ballast may be taken on board the submarine by means of tanks K, L, and M to enable the submarine to act as a mobile anchor for the surface vessel. The apparatus on the surface vessel meantime supplies electric current for operating the mechanism in the submarine and also provides a continuous circulation of air. Operating in this manner the submarine may tow the surface vessel or the surface vessel may tow the submarine.

The circulation of air and transmission of electric current is accomplished in the following manner:— A special insulated hose 60 (see Figs. 6, 7 and 8), is provided with two metallic air ducts, 61 and 62 imbedded therein, the upper ends of these metallic ducts being stripped from the hose and entering into compartments in the drum D and passing through insulated blocks 63—64 securely cemented into the drum, one of these ducts entering the airtight compartment H and the other entering airtight compartment I for the purpose hereinafter explained. The ducts have holes drilled in them in those portions which extend into the compartments and the ends of the ducts are held in place in the drum by countersunk headed screws 65 and 66 which serve also to clamp contact rings 67 and 68 to insulated plugs which are secured in the end flanges of the drum and form a seating for the rings. Additional insulated plugs are inserted where necessary to hold the rings in suitable spaced alignment. Telephone wires 69 and 70 also imbedded in the hose are also brought into the compartments H and I through the insulated blocks 63 and 64 and are in a similar manner connected up with the outer contact rings 71 and 72. Spring contactors 73 and 74 secured to the insulated wooden curbing engage the rings 67 and 68 and carry the power current while contactors 75 and 76 engaging the rings 71 and 72 carry the telephone and signalling current. Suitable hand-hole plates 77 and 78 are shown to permit of making the connections within the airtight compartments H and I. A wire rope towing cable may also be embedded in the hose if desired and such cable is shown at 61' suitably secured to the drum.

The drum is carried on a hollow shaft with a plug in the longitudinal center as shown. This shaft is also bored with a number of small holes, as shown, to permit air to be pumped through it into or from the compartments H and I, and stuffing boxes 79 and 80, permit rotation of the shaft and drum without rotating the air-supply pipes 81 and 82.

The drum is revolved by suitable gearing as shown in Fig. 7, where 83 is a pinion turned by a crank and shaft and meshing with a series of internal teeth cast integral with the end flange of the drum.

Pipe 81 is connected up with an air compressor, while pipe 82 is connected up with a vacuum pump of equal capacity.

When the submarine apparatus is submerged and the diver's door 84 in the bottom is closed, it is desirable to maintain as near atmospheric pressure in the submarine as is possible. Suitable gauges (not shown) in the submarine show the pressure there at all times, and running the two pumps at the same speed, one delivering fresh air and the other drawing out the vitiated air from the bottom of the apparatus will maintain a healthful condition of the atmosphere at all times. If it is desired to open the divers' door 84 in the bottom of the submarine to pick up objects from the bottom or to emerge in a diving helmet or dress, it is only necessary to close the valve 85 within the boat which shuts off the suction to the vacuum pump and the pressure pump will build up an air pressure within the submarine apparatus equal to that exerted by the surrounding water at the bottom of the apparatus and thus equalize the pressure on both sides of the door 84, and the door may then be unbolted and dropped down on its guide rails 86 and 87 and slid back out of the way. An outwardly opening check valve 88 will automatically open in case the internal air pressure exceeds the pressure of the water outside.

The hose carrying the air ducts and electric transmission wires enters a framework J at the Y connection 89, Fig. 5, and at this point I prefer to separate the air ducts and have them enter on opposite sides of the submarine apparatus to permit of greater flexibility in passing through the various fittings in entering the submarine apparatus.

The framework J being in the form of a swinging yoke turning in the watertight bearings 90 and 91 permits it to swing forward over the conning tower when being towed by the surface vessel and also permits it to lead aft when the submarine apparatus is on the bottom and is towing the surface vessel.

N designates a revoluble conning tower carried in a stuffing box casting 92, see Fig. 4, and surrounding the inboard end of the tubular tower and attached thereto I provide a toothed ring 93 which rests on balls running in a race in a ring 94 securely attached to the hull. A pinion 95 attached to a shaft provided with a hand wheel 96 enables the operator to train the lookout windows in any direction. These windows are shown looking forward in line with the longitudinal axis of the apparatus, and window 97 is shown in Fig. 4 as provided with a ball-and-socket joint which enables a camera to be attached to its inboard end, as shown by broken lines, and trained on any object within certain limits without revolving the conning tower. This combination of revolving tower and ball-and-socket window casing enables an all-around view to be taken and provides a large vertical field as well. A window 98 is provided as the operator's lookout window, and back of an additional window 99, I install a search light projector for illuminating the object on which the camera may be trained, or a high-powered flashlight may be placed in this window, if desired. I have found that certain large fish are very timid and as soon as a search light is turned on them they dart away. Thus the procedure would be to first train the camera on the fish before turning on the light.

The conning tower is provided with a hatch cover 100 to provide access to the submarine apparatus.

In recovering deeply embedded shell fish a special type dredge O, Figs. 3 and 5, is lowered down from the deck of the surface vessel by a line 101 and hauled into position alongside the submarine apparatus by line 102 which runs over sheave 103 to drum 103'. By referring to Fig. 5 it will be seen that the propeller 11 may be lowered at any desired angle between the open framework of the dredge and upon its being revolved at speed it will produce a rapid current substantially in the direction of the arrows shown in Fig. 5 and set up a scouring action and make a trench, driving the upper particles forming the waterbed upward and aft, the finer particles being driven by the velocity of the water through the netting surrounding the rear portion of the dredge, while the larger objects, such as the shell fish, will be retained in the rear portion of the dredge. When the operator, through the open diver's door or window, sees the dredge is filled, the propeller is swung clear of the dredge and the dredge is hauled up to the surface vessel.

In recovering sponges or other objects that are to be picked up from the bottom by means of the extensible arm and grab, a different type of receptacle is used, as shown in Figs. 4 and 5, in which P is a sled-shaped framework covered with netting on its front, bottom, sides and rear and a portion of its top, leaving an open space at the top forward. Line 104 is attached to the upper framework of the receptacle and passes up over sheave 105 to a drum 103' and which is driven through the line shafting and gears as shown in Fig. 4. The arm 42 extends the grab G in its open position over the objects to be recovered, and the grab is then lowered and closed, then raised and swung around to the position shown in Fig. 5 opened and the objects fall into the sled-like receptacle P. Lifting up the receptacle by line 104 causes the objects to fall back in its closed end and after the receptacle is filled by successive operations of the grab it is hauled up to the surface vessel.

An alternative method of searching the waterbed may be employed where the sea bottom is rocky or covered with coral formation.

This may be readily understood by referring to Figs. 1 and 3 in which 106 is a pressure-resisting tank or buoy attached by line 107 to drum 108. This drum is operated by worm 109 the shaft of which extends into the submarine apparatus through a stuffing box where, by means of a crank the buoy line 107 may be payed out or taken in. Assuming that the positive buoyancy of this buoy is 300 lbs. when floating on the surface, then, if water ballast is admitted in the submarine so as to give it a negative buoyancy of, say, 150 lbs., it is obvious that the buoy will be then supporting a weight of 150 lbs., and its positive buoyancy will also be reduced to 150 lbs. The operator in the submarine may then control its depth by winding in or paying out the line 107 and may propel the submarine in all directions within the limits determined by the length of its power cable tow line.

In wreck-finding operations I use two additional surface boats, not shown, carrying a "sweep" or drag line extending from a heavy weight on one of the surface vessels to a similar weight on the other vessel; this sweep or drag line is kept taut between the surface vessels a short distance above the bottom, if the waterbed is rough bottom, or it may be permitted to drag over the waterbed itself if the bottom is smooth. The sweep or drag line passes through the fair lead 110 and when the sweep line catches on any obstruction extending above the waterbed, as the three vessels are being propelled over the same, the lead of the sweep line will be changed and begin to run through the fair-lead in the direction of the obstruction, and this may readily be detected by the operator within the submarine. The surface vessels are then brought to anchor and the submarine is caused to follow the lead of the line to the obstruction, when the diver's door may be opened and divers sent out to examine the wreck, if the obstruction should prove to be a sunken vessel, or the wreck may be observed from the portholes of the submarine apparatus.

When vessels have been sunk a long time they are frequently covered with sand or silt which must be pumped off or otherwise removed to get at the valuable contents within the hulk. In this case it is desirable to determine the outline of the hulk lying beneath the surface of the waterbed. To accomplish this in a rapid and efficient manner I provide a cylindrical tube 111 which may be attached to the top of the submarine apparatus, as shown in Fig. 5, having its upper end provided with a cap 112. A piston rod 113 secured to a piston 114 passes down through a stuffing box 115 at the end of the tube 111 where it is exposed to the interior of the submarine apparatus. The piston rod 113 passes thence through a stuffing box 116, gate valve 117 and a guide pipe 118. A four-way valve 119 is connected to a hydraulic pump, not shown, which is connected to the sea and which, when in operation, forces water above the piston 114 through the pipe 120, thus forcing the piston rod downward, or through the pipe 121 to force the piston and rod upward. The lower end of the piston rod 113 may be fitted with a "core drill" to take samples of the materials into which it is driven, which may readily be accomplished by rotating the piston rod in any suitable manner. By withdrawing the core drill above the gate valve 117 the valve may be closed and the drill further withdrawn, so that its end lies in the space between the stuffing boxes 115 and 116, to inspect the nature of the materials into which it has been driven.

When a sunken hulk is once located by causing the submarine to traverse the waterbed, the hulk's position and outline may readily be plotted by driving stakes in the waterbed, through the diver's door, to show where excavation operations should be conducted to reach the cargo.

It will be seen from the foregoing description that I provide a mobile submarine apparatus capable of being navigated over the waterbed in any desired direction and provide the apparatus with means for reaching out a mechanically operated arm and grab to pick up objects lying on the waterbed while the operator is comfortably encased and protected against hydrostatic pressure and is provided with an ample circulation of air. It will be apparent also, that a quick inspection may be had of any sunken object extending above the waterbed and lying between the courses maintained by surface vessels, running parallel courses, connected together by a sweep line extending from one vessel to the other and dragging on or over, but adjacent to the waterbed, said sweep line acting as a guide line and thus enabling the operator in the submarine to proceed directly to the sunken obstruction, and also making it possible that the position of sunken vessels may be determined when lying below the waterbed.

It is obvious that various changes and modifications of the hulls of the surface and submarine vessels and their attachments, and the methods of operation, may be made within the spirit of this invention and the scope of the following claims.

What I claim is:

1. In a submarine harvesting and recovery apparatus, a surface vessel, a submarine apparatus flexibly attached thereto, means for supplying air and power to the submarine apparatus, means for lowering and raising the submarine apparatus to and from the waterbed, and a buoy for maintaining said submarine apparatus at any desired height above the waterbed.

2. In a submarine apparatus capable of being navigated on the waterbed, a traction wheel located in the bow thereof and capable of being revolved and turned in any direction to move the vessel, in combination with a bottom contacting steering wheel carried by a rudder post, and propeller driving mechanism whereby propulsion may be had in co-operation with the forward tractor wheel to move the submarine apparatus in any desired direction.

3. In a submarine harvesting and recovery apparatus, a submersible vessel, means for propelling and steering said submersible vessel in all directions above and upon the waterbed while submerged, a lazy tongs mechanism carried by said vessel and provided with means whereby it may be swung laterally and projected at an angle downwardly with respect to said vessel, a grab member carried by said lazy tongs mechanism, and means for adjusting said grab member with respect to said lazy tongs mechanism and waterbed.

4. In a submarine harvesting and recovery apparatus, a submersible vessel, means for propelling and steering said submersible vessel in all directions above and upon the waterbed while submerged, a lazy tongs mechanism carried by said vessel and provided with means whereby it may be swung laterally and projected at an angle downwardly with respect to said vessel, a grab member provided with relatively movable jaws carried by said lazy tongs mechanism, means for raising and lowering said grab mechanism with respect to said lazy tongs mechanism and waterbed, and means for imparting relative movement to said jaws.

5. In a submarine apparatus, a submersible vessel capable of navigation adjacent to and upon the waterbed, and means carried by said vessel and operable to recover submerged objects, said means including a substantially vertical oscillatable shaft, a member having one end pivotally attached to said shaft and capable of pivotal movement in a substantially vertical plane, a lazy tongs mechanism carried by said member, means for oscillating said shaft, means for pivotally moving said member, and means for extending and retracting said lazy tongs mechanism.

6. In a submarine apparatus, a submersible vessel capable of navigation adjacent to and upon the waterbed, and means carried by said vessel and operable to recover submerged objects, said means including a substantially vertical oscillatable shaft, a tubular member providing a power cylinder and having one end pivotally attached to said shaft and capable of pivotal movement in a substantially vertical plane, a lazy tongs mechanism carried by said member and comprising a pair of relatively movable legs one of which is pivotally attached to said tubular member and the other of which is mounted for sliding movement with respect to said member, means for pivotally moving said member, and means for extending and retracting said lazy tongs mechanism, including a piston slidable in said power cylinder and by which the sliding mounting of said lazy tongs leg is operated, and means for subjecting said piston to the action of a pressure fluid whereby its movement is controlled.

7. In a mobile submarine apparatus, a revolvable conning tower attached thereto, a stuffing box surrounding the walls of the revolvable tower, a gear attached to the inner end of the tower, a pinion to revolve the same, and a ball and socket objective lens carrier housed in the wall of the revolvable tower whereby a camera may be trained upon objects within a limited field without revolving the tower.

8. In a submarine apparatus, a revolvable conning tower, means for making same watertight, means for supporting and revolving the conning tower, a plurality of windows for simultaneously obtaining vision and taking pictures, a ball-and-socket objective lens carrier, a lookout window, and a light projector window, said lens carrier and said lookout and light projector windows enabling a camera operator to find, project a light upon and photograph any object within range of vision from the revolvable conning tower.

SIMON LAKE.